UNITED STATES PATENT OFFICE.

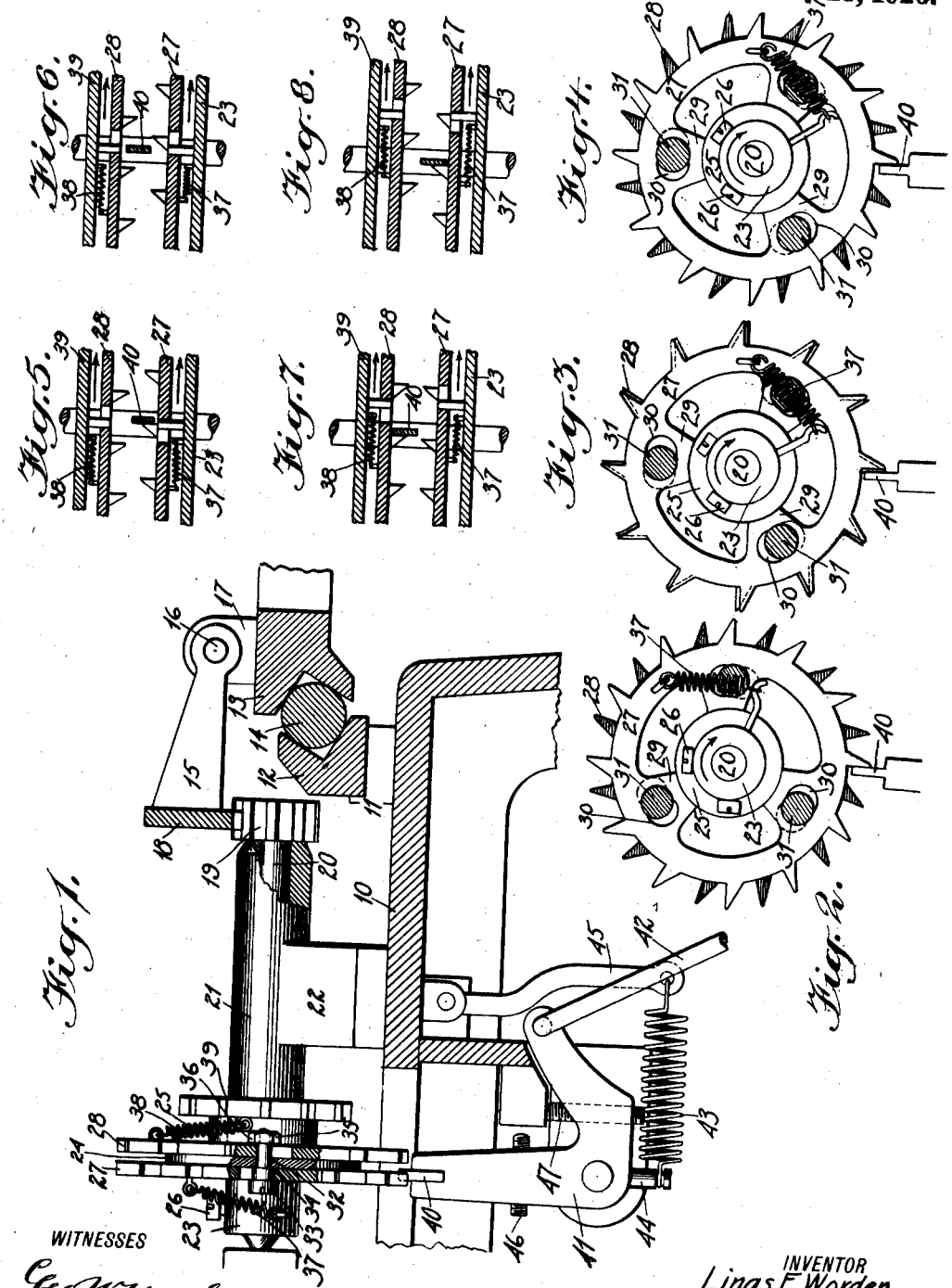

LINAS F. WORDEN, OF NEW YORK, N. Y., ASSIGNOR TO UNDERWOOD TYPEWRITER COMPANY, OF NEW YORK, N. Y., A CORPORATION OF DELAWARE.

TYPEWRITER-ESCAPEMENT.

1,341,350.

Specification of Letters Patent.  Patented May 25, 1920.

Application filed February 4, 1915. Serial No. 6,041.

*To all whom it may concern:*

Be it known that I, LINAS F. WORDEN, a citizen of the United States, and a resident of the city of New York, borough of Manhattan, county and State of New York, have invented a new and Improved Typewriter-Escapement, of which the following is a full, clear, and exact description.

My invention has for its object to provide a speedy escapement, and one which moreover avoids the possibility of the feed dog being moved forward twice between adjacent teeth of the escapement wheel. The escapement is preferably constructed with two escapement wheels mounted for limited rotary movement relatively to a shaft and held yieldingly in predetermined positions relatively to the shaft by springs, a dog being provided for engaging the escapement wheels in the customary manner.

Additional objects of the invention will appear in the following specification in which said preferred form of my invention is disclosed.

In the drawings similar reference characters refer to similar parts in all the views in which—

Figure 1 is a fragmentary view showing in section a typewriter machine embodying my invention;

Figs. 2, 3 and 4 are views showing the relative positions of the escapement wheels during different movements; and Figs. 5, 6, 7 and 8 are diagrammatic views showing how the escapement wheels are engaged by the dog.

The frame of the typewriter machine is constructed in the customary manner and is provided with a plate 10 on which rests a support 11 for the rear rail 12 for supporting the rear carriage rail 13, the usual roller-bearing 14 being disposed between the rails 12 and 13. Arms 15 are pivoted at 16 to the lugs 17 which extend upwardly from the rear carriage rail 13, a feed rack 18 being secured to the arms 15.

Meshing with the feed rack 18 there is a pinion 19 mounted on a shaft 20 journaled in a bearing 21, mounted on a bracket 22 which is supported by the plate 10. On the end of the shaft 20 there is mounted a collar 23 having a disk 24 and a hub 25 disposed at each side of the said disk 24. This collar 23 is held against rotation relatively to the shaft 20 by set screws 26. The escapement wheels 27 and 28 are mounted on the hubs 25, one at each side of the disk 24, the said escapement wheels 27 and 28 having arms or spokes 29 which bear against the hubs 25, the escapement wheels 27 and 28 being rotatably mounted in this way on the said hubs 25. In the arms or spokes 29 there are slots 30 in which are disposed the bolts 31, the said bolts extending through orifices 32 in the disk 24. The heads 33 of the bolts 31 bear against the outer side of the escapement wheel 27 and shoulders 34, on the bolts 31 bear against the disk 24, nuts 35 on the bolts 31 turning home against shoulders 36. By this means the escapement wheels 27 and 28 are prevented from binding against the disk 24. The escapement wheel 27 is held forwardly by a spring 37, which is secured to the escapement wheel 27 at one end and to the collar 23 at the other end and tends constantly to advance said wheel 27. The escapement wheel 28 is held forwardly by a spring 38 which is secured at one end to the escapement wheel 28 and at the other end to the hub 25 or to the back spacing ratchet 39. The escapement wheels 27 and 28 are engaged by a dog 40 mounted on a dog rocker 41 in any suitable manner; as for instance, in the manner disclosed in United States Patent No. 1,003,972 dated September 26, 1911. In this patent, the dog corresponding to the dog 40 is pivoted to its dog-rocker. The dog-rocker 41 is operated by a link 42, and is held yieldingly with the dog 40 in engagement with the teeth of the escapement wheel 27 by means of the spring 43, which is secured at one end to a pin 44 on the dog rocker 41, and at the other end to a support 45 connected with the plate 10. The movement of the dog rocker 40 is limited by means of the adjustable screw stops 46 and 47, all in a manner readily understood.

As has been stated, the dog rocker 41 is normally held yieldingly in a position where the dog 40 engages the teeth of the escapement wheel 27, the relative positions of the teeth of the escapement wheels and the dog 40 being shown in Fig. 1 of the drawings. On the downward stroke of a finger key lever, the dog 40 is moved by the dog rocker 41 to the position shown in Fig.

6 of the drawings, the escapement wheel 27 jumping forward under the influence of its spring and the carriage which is power driven, moving immediately when the dog 40 disengages itself from the teeth of the escapement wheel 27 and the carriage by the means described, rotating the shaft 20 and the collar 23 which carries with it the escapement wheel 28, both 28 and 27 moving in the direction of the arrows shown in Fig. 6 of the drawings. With this movement one of the teeth of the escapement wheel 28 will engage the dog 40, and hence be arrested, but the carriage will continue to move a short distance and the shaft 20 will continue to rotate, as bolts 31 moving in the slots in the escapement wheel 28 against the tension of the springs 38. When the bolts reach the end of the slots in the escapement wheel 28, the escapement wheels and the dog will be in the relative position shown in Fig. 7 of the drawings. At this time the carriage has made a part of its feeding movement, but the wheel 27 has substantially completed its movement. On the up stroke of the type bar, the dog rocker 41 will return to the position shown in Fig. 1 of the drawings, the dog 40 moving from engagement with the teeth of the escapement wheel 28 (permitting spring 38 to advance wheel 28 independently) to a position where it will engage one of the teeth of the escapement wheel 27 to detain the same while the wheel or collar 23 advances (together with the carriage) to Fig. 8 position. In order that there shall be sufficient clearance the tooth on the escapement wheel 28 which engages the dog must be slightly in advance of the tooth on the escapement wheel 27, which will engage the dog when the dog is moved back to normal position; but on the other hand, if the tooth on the escapement wheel 28 were very far in advance of the said tooth on the escapement wheel 27, there would be danger that the feed carriers would overfeed by taking two teeth or spaces. It is, therefore, preferred that the escapement be so constructed that the escapement wheels be so proportioned with reference to their slots and the springs provided, that they will assume the position shown in Figs. 5, 6, 7 and 8 of the drawings, during a complete cycle. When the rocker 41 is moved back to normal position by the upward movement of the type bar, the dog 40 will move to the position shown in Fig. 8 of the drawings, the shaft 20 rotating and the carriage moving under the influence of the spring drum, while dog 40 holds the wheel 27 stationary until the bolts 31 move to the ends of the slot 30 in the said escapement wheel 27, this forward movement being carried on against the tension of the spring 37.

The escapement wheel 27 is the one normally in engagement with the dog 40, and hence may be termed the main escapement wheel. The cycle of operations of said main escapement wheel 27 is completed in advance of the completion of the carriage movement, so that said main escapement wheel 27 is prepared to enter upon its next cycle of operations before the current movement of the typewriter carriage is completed. Thus the progress of the carriage itself is not delayed, since the new cycle of feeding operations is well under way (in rapid operation) when the carriage arrives at the point at which such cycle is usually begun.

This completion of the cycle of operations of the main escapement wheel 27 is secured by the use of a spring 37, which, at the earliest opportunity, snaps the main wheel 27 around in advance of the main shaft 20; and this main escapement wheel 27 maintains this lead, and, consequently, reaches its final position ahead of the carriage, and, therefore, the next feeding operation may successfully begin that much earlier; and thus increase of speed of operation is secured.

Besides this result, this movement of the main wheel 27 advances that tooth thereof which has just been released from the dog 40, this advance being very rapidly made, in advance of the turning shaft 20, so that there is no danger of the returning dog 40 colliding with said released tooth in rapid operations of the machine; and also avoiding danger of the dog 40 reëngaging the same tooth and preventing feed of the carriage.

Thus, a double advantage is gained by the provision of the spring-driven advance of the main escapement wheel 27.

Still another advantage flows from the use of the device of advancing the main escapement wheel 27 as described, that is, it becomes practicable to use, in conjunction therewith, the spring-driven auxiliary escapement wheel 28, by the employment of a single, simple dog 40 to co-act with both wheels. Thus, by a very simple construction, inexpensive to make, and readily applied to existing machines, all of the prior advantages of the prior art are preserved, while the further and important advantages are gained of completing the cycle of operations of the main escapement wheel preparatory to the beginning of its new cycle, ahead of the completion of the carriage movement.

Having thus described my invention I claim as new and desire to secure by Letters Patent:

1. In an escapement for typewriters, an operating member, two escapement members movable relatively to each other and to the operating member, and said operating member being movable in advance direction independently of each of said escapement members, resilient means for holding the escapement members yieldingly in predetermined positions advanced relatively to the operating member, and a dog for engaging the escapement members.

2. In an escapement for typewriters, a rotary shaft, a main escapement wheel mounted to rotate on the shaft relatively thereto, an auxiliary escapement wheel mounted to rotate on the shaft and independently of the main escapement wheel, said shaft being rotatable in advance direction independently of each wheel, means for limiting the forward and rearward rotary movement of each of the escapement wheels relatively to the shaft, a dog for engaging the escapement wheels, resilient means connecting the main escapement wheel with the shaft which is under tension when the dog engages the main escapement wheel and the main escapement wheel is in its rearmost position relatively to the shaft, and resilient means connecting the auxiliary escapement wheel with the shaft which serves to hold the auxiliary escapement wheel yieldingly in its forward position relatively to the shaft when the main escapement wheel is in the said rearmost position.

3. In an escapement for typewriters, a rotary shaft, a main escapement wheel and an auxiliary escapement wheel mounted upon the shaft for rotating independently of each other and independently of the shaft, said shaft being rotatable in advance direction independently of each wheel, means to limit the forward and rearward rotary movement of each of the escapement wheels, a dog device for engaging the escapement wheels one at a time, and resilient means connecting the escapement wheels with the shaft, the resilient means of the main escapement wheel being normally under tension with the dog in engagement with said main escapement wheel.

4. In an escapement for typewriters, a shaft, a disk secured to the shaft, two escapement wheels with slots mounted for rotating on the shaft, one at each side of the disk bolts on the disk disposed in the slots for limiting the rotary movement of the escapement wheels relatively to the disk, springs for holding the escapement wheels yieldingly relatively to the shaft, and a dog for engaging the teeth of the escapement wheels.

5. In an escapement for typewriters, a rotary shaft, main and auxiliary escapement wheels mounted for rotating independently of each other, and independently of the shaft, said shaft being rotatable in advance direction independently of each wheel, a dog device for engaging the escapement wheels one at a time, and resilient means for advancing each escapement wheel relatively to the shaft, each resilient means being under tension when the dog is in engagement with its associated escapement wheel.

6. In an escapement for typewriters, a rotary shaft, a main escapement wheel and an auxiliary escapement wheel, both mounted for rotating on the shaft independently thereof and of each other, said shaft being rotatable in advance direction independently of each wheel, means for limiting the rotary movement of the escapement wheels relatively to the shaft, resilient means for setting the main escapement wheel in advance of the auxiliary escapement wheel and of the shaft, and a dog for engaging the escapement wheels.

7. In an escapement for typewriters, a rotary shaft, main and auxiliary escapement wheels mounted for rotating on the shaft independently thereof, and relatively to each other, said shaft being rotatable in advance direction independently of each wheel, resilient means for advancing said wheels relatively to the shaft, means for limiting the rotary movement of the escapement wheels relatively to the shaft, said resilient means yieldingly holding the auxiliary escapement wheel normally advanced, and a dog device for engaging both escapement wheels.

8. In an escapement for typewriters, a rotary shaft, main and auxiliary escapement wheels mounted for advancing on the shaft relatively to each other and to the shaft, said shaft being rotatable in advance direction independently of each wheel, means for limiting the displacement of the escapement wheels, and resilient means for normally yieldingly holding the escapement wheels with the auxiliary escapement wheel disposed substantially a half a step in advance of the main escapement wheel.

9. In an escapement for typewriters, a rotary shaft, main and auxiliary escapement wheels mounted for rotatively advancing on the shaft relatively to each other and to the shaft, said shaft being rotatable in advance direction independently of each wheel, means for limiting the displacement of the escapement wheels relatively to the shaft, resilient means for yieldingly holding the escapement wheels with the teeth of the auxiliary escapement wheel advanced but adjacent to the rear of the teeth of the main escapement wheel, when said main escapement wheel is in its normal position relatively to the shaft, and a dog device for engaging the escapement wheels.

10. In an escapement for typewriters, a rotary shaft, a main escapement wheel mounted for rotating on the shaft independently thereof, a dog normally in engagement with the main escapement wheel, an auxiliary escapement wheel mounted for rotating on the shaft independently thereof, said shaft being rotatable in advance direction independently of each of the wheels, means to limit the relative movement of the escapement wheels so that the teeth of the escapement wheels are substantially side by side when the auxiliary escapement wheel is at its rearward position relatively to the shaft and the main escapement wheel is at its advanced position relatively to the shaft, and resilient means for holding the escapement wheels yieldingly forward, the dog being adapted to move out of engagement with the main escapement wheel and into engagement with the auxiliary escapement wheel, and back to the main escapement wheel.

11. In an escapement for typewriters, a shaft, a main escapement wheel, an auxiliary escapement wheel, the escapement wheels being mounted to rotate on the shaft and relatively thereto and to each other, said shaft being rotatable in advance direction independently of each wheel, resilient means for holding the auxiliary escapement wheel advanced, a dog normally engaging the main escapement wheel and adapted to move into engagement with the auxiliary escapement wheel and back again to the main escapement wheel, and resilient means for advancing the main escapement wheel when released from said dog.

In testimony whereof I have signed my name to this specification in the presence of the two subscribing witnesses.

LINAS F. WORDEN.

Witnesses:
EVERARD B. MARSHALL,
PHILIP D. ROLLHAUS.